UNITED STATES PATENT OFFICE.

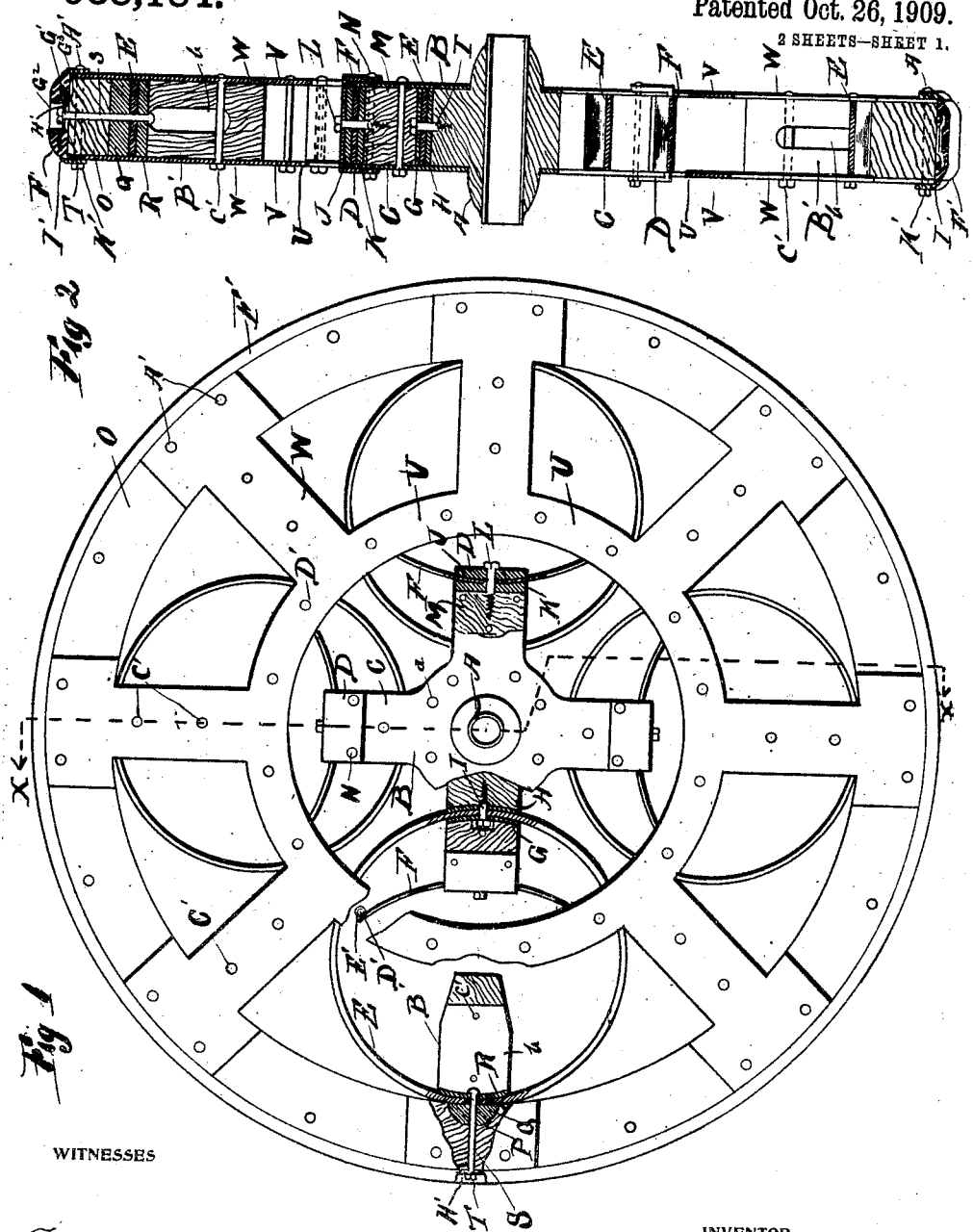

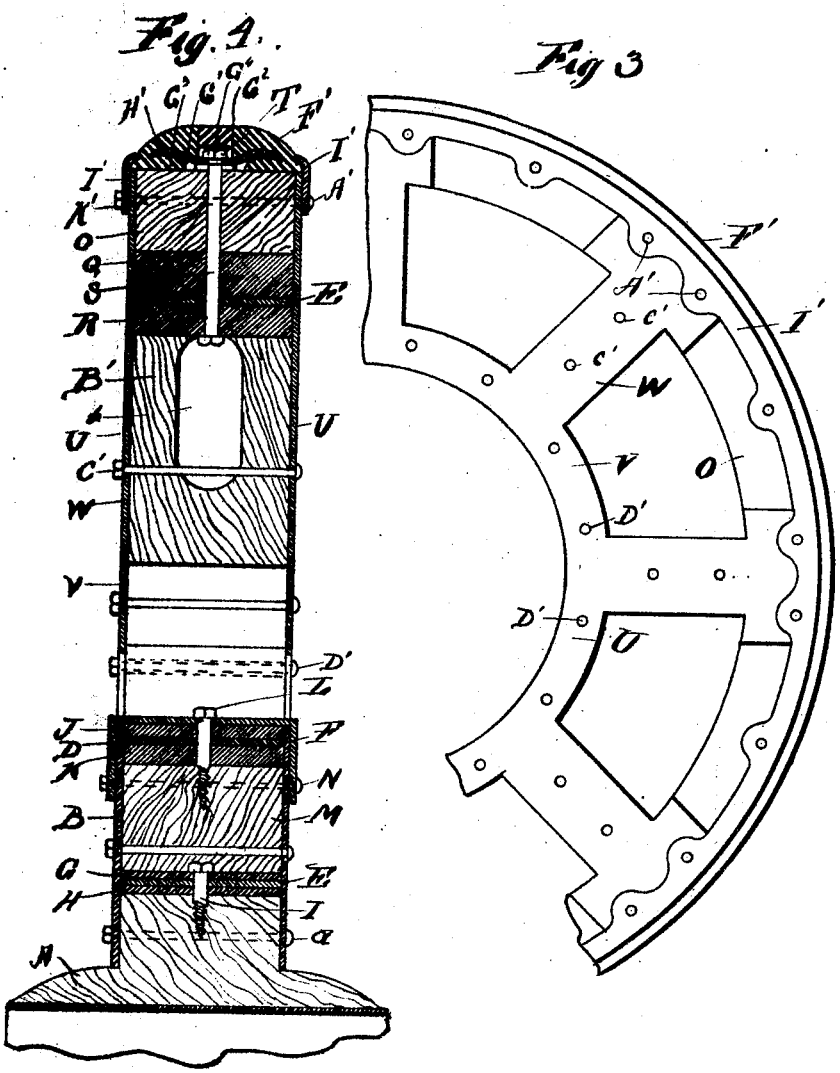

WALTER D. TRIGALET, OF MAMARONECK, NEW YORK.

VEHICLE-WHEEL.

938,184.

Specification of Letters Patent. Patented Oct. 26, 1909.

Application filed June 17, 1908. Serial No. 438,934.

*To all whom it may concern:*

Be it known that I, WALTER D. TRIGALET, a citizen of the United States, residing at Mamaroneck, county of Westchester, and State of New York, have invented a certain new and useful Improvement in Vehicle-Wheels, as set forth in the following specification.

My invention relates to a new and useful improvement in vehicle wheels, and has for its object to so construct such a wheel as to produce a spring or cushion action between the rim and the hub thereof, whereby the jar and vibration extending to the wheel traveling from the road bed will be largely absorbed within the wheel instead of being transmitted to the vehicle and the occupants.

With these ends in view, this invention consists in the details of construction and combination of elements hereinafter set forth and then specifically designated by the claims.

In order that those skilled in the art to which this invention appertains may understand how to make and use the same I will describe its construction in detail, referring by letter to the accompanying drawing forming a part of this specification, in which—

Figure 1 is a side elevation of my improved wheel, a portion thereof being in section, having the flanges removed, clearly illustrating the construction of the same. Fig. 2, is a sectional view at the line $x$—$x$ of Fig. 1. Fig. 3, a side elevation of a portion of the wheel showing the shape and position of the flanges, and Fig. 4, is an enlarged sectional view of the upper half of Fig. 2.

In carrying out my invention as here embodied, A represents the hub, which may be made of one solid piece of wood as desired, to which is secured, by means of screw bolts $a$, the thin metal plates B, with which are formed the extensions C; to the ends of these extensions are secured the caps D, thus forming housings through which pass the springs E and F. The springs E which are circular in shape are securely held therein by the rubber pads G and H, and the screws I which pass through the rubber pads, the screws are then threaded into the hub A of the wheel. The springs F which form the arc of a circle are held in these receptacles by means of the rubber pads J and K, and the screws L passing through these pads and the caps D then threaded into the wooden plugs or fillings M which rest between the rubber pads G and K. In order that these plugs or fillings may be firmly held in place, I provide bolts N, which pass through the extensions C of the plates B, into said plugs or fillings.

O indicates the rim of a wheel, which is made of wood as in the ordinary wheels, except that the notches P are formed therein for the reception of the rubber pads Q. The springs E are then placed against these rubber pads Q and other rubber pads R placed against the inside surface of the springs E, the bolts S are then passed through these rubber pads, the springs E, the rim O and the nuts T threaded thereon for holding them in place.

U represents a metallic plate so formed as to have a circular portion V and extensions W radiating therefrom at suitable intervals. The ends of these extensions are sunk into the rim O and secured thereto by suitable bolts A'. One of these plates are placed upon either side of the rim, and between them are secured the wooden blocks B' by means of the bolts C' which pass through the plates U and the blocks B', said blocks having formed therein the openings $b$ into which the bolts S may drop when it is desired to remove the tire.

D' indicates bolts around a number of which are placed the rollers E' against which the ends of the springs F are adapted to rest and move up and down when receiving a shock.

F' represents a rubber tire having an opening G' formed between the base $G^3$ and the tread around the entire tire, and in this opening G' is placed the metallic tire H' which is bolted to the rim of the wheel by the bolts S which also hold the springs E in position, and as the nuts E are threaded on the bolts S they will draw the metallic tire H' toward the rim of the wheel which will compress the face of the tire between said metallic tire H' and the rim of the wheel thus holding the rubber tire F' securely in position. In the rubber tire F' are formed the openings $G^3$ whereby the nuts T may be placed on the bolts S and these openings may be filled up with a rubber plug $G^4$ or other suitable material.

The flanges represented by I' are placed on either side of the rim of the wheel and held thereto by the bolts A' which pass through said flanges and the rim of the wheel. The nuts K' are then threaded on the ends of the bolts for holding them in place. The space left between the metallic tire H' and the rim of the wheel will give a certain amount of resiliency which will relieve the springs of part of the strain.

From this description it will be seen that the wheel thus made, when striking any obstruction while traveling over a road bed will absorb the greater portion of the jar which would otherwise be transmitted to the vehicle. The fact being to force the circular springs E together, which will thereby produce extreme resiliency. While the said circular springs are rigid in their fastenings and will sustain a considerable strain, yet, they have the auxiliary springs or those which form the arc of a circle for a relief, their objects being to transmit the drive from the axle to the rim without any sudden shock, to sustain the side strain, because of the leverage on the rollers E', which are secured to the metallic plates U, the extensions of which act as spokes for the wheel, and being free to act on the rollers, they will absorb a portion of the shock given to the periphery of the wheel.

My wheel entirely overcomes the many disadvantages which have heretofore been attended upon the use of the ordinary wheel for motor vehicles, for when said wheels are fitted with solid rubber tires the shock and vibration transmitted to the top of the vehicle is trying upon the mechanism, as well as the occupants, and when pneumatic tires are used, constant annoyance and expense is occasioned by puncture and other accidents, and when a pneumatic tire is out of repair the vehicle is seriously crippled, whereas, by my improvement, the resiliency of the pneumatic tire is provided without the liability of accident from puncture and deflating.

Of course I do not wish to be limited to the exact details of construction here shown, as these may be varied within certain limits without departing from the spirit of my invention.

Having thus fully described my invention, what I claim as new and useful, is—

1. In combination, a hub made from a solid piece of wood, a thin metallic plate having extensions formed therewith placed upon either side of the said hub, caps secured upon the outer ends of said extensions, circular springs passing between said extensions, rubber pads placed upon either side of said springs, between said extensions, a screw passing through the rubber pads, the springs and the end of the hub for holding said springs in position, a second spring forming an arc of a circle passing between the extensions, rubber pads placed upon either side of said springs between said extensions, screws passing through the caps, the rubber pads and the springs for holding said springs in position, wooden plugs and means for holding said plugs in position, a rim having notches formed in the under side thereof, a second metallic plate so formed as to have a circular portion and extensions radiating therefrom, the ends of said extensions being secured to the rim, one of them upon either side of the rim, rubber pads placed between the extensions against which the circular springs are adapted to rest, other rubber pads lying between the extensions radiating from the last named plates, placed on the inner face of the circular spring, a bolt passing through said rubber pads, springs and rim, a nut threaded on said bolt for holding it in place, wooden blocks having openings formed therein secured between the extensions formed with the last named plates, bolts passing through said extensions and said wooden block for holding the same in place, rollers placed between the circular portions of the last named plates, bolts passing through said rollers and said plates for movably securing said rollers in position against which the ends of the spring forming the arc of the circle are adapted to rest, a rubber tire, and means for securing the tire to the wheel, as specified.

2. The herein described combination of a hub, a metallic plate having extensions formed therewith, secured to said hub, caps fastened on the outer end of said extensions, a rim, a second metallic plate so formed as to have a circular portion and extensions radiating therefrom, the ends of said extensions being fastened to the rim, circular springs secured between the extensions formed with the first named plate to the hub, also between the extensions formed on the second named plate to the rim, rollers secured between the circular portion of the last named plates, and a second set of springs forming the arc of a circle secured between the extensions formed on the first named plates, the ends of said springs adapted to rest against the rollers, substantially as and for the purpose set forth.

In testimony whereof, I have hereunto affixed my signature in the presence of two subscribing witnesses.

WALTER D. TRIGALET.

Witnesses:
JOHN C. KANE, Jr.,
CHAS. I. BOYD.